(12) United States Patent
Dai

(10) Patent No.: US 10,599,242 B2
(45) Date of Patent: Mar. 24, 2020

(54) SINGLE-TYPE GOA CIRCUIT AND DISPLAY APPARATUS

(71) Applicant: Wuhan China Star Optoelectronics Technology Co., Ltd., Wuhan, Hubei (CN)

(72) Inventor: Ronglei Dai, Guangdong (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 15/970,589

(22) Filed: May 3, 2018

(65) Prior Publication Data

US 2019/0129547 A1    May 2, 2019

Related U.S. Application Data

(63) Continuation of application No. PCT/CN2017/116988, filed on Dec. 18, 2017.

(30) Foreign Application Priority Data

Oct. 31, 2017 (CN) .......................... 2017 1 1069470

(51) Int. Cl.
*G06F 3/041* (2006.01)
*G09G 3/36* (2006.01)
*G02F 1/1345* (2006.01)

(52) U.S. Cl.
CPC ........ *G06F 3/0412* (2013.01); *G02F 1/13454* (2013.01); *G06F 3/0416* (2013.01);
(Continued)

(58) Field of Classification Search
CPC .. G06F 3/0412; G06F 3/0416; G02F 1/13454; G09G 3/3677; G09G 3/3622;
(Continued)

(56) References Cited

U.S. PATENT DOCUMENTS 9,001,013 B2 *  4/2015  Hung ..................... G11C 19/00
                                                 345/100
9,064,466 B2 *  6/2015  Lin ...................... G09G 3/3611
(Continued)

FOREIGN PATENT DOCUMENTS

CN    105206246 A    12/2015
CN    106128397 A    11/2016
(Continued)

*Primary Examiner* — Fred Tzeng
(74) *Attorney, Agent, or Firm* — Hemisphere Law, PLLC; Zhigang Ma

(57) ABSTRACT

The present application provides a single-type GOA circuit comprising a controllable signal setting unit for providing a controllable signal. The controllable signal is held at a potential of a constant low-level voltage source when the circuit is operated in normal status, and at a potential of a constant high-level voltage source when the circuit is in a transmission suspended period. The potential of the signals in the current leakage path in the transmission suspended period is changed in the application so that voltage controlling and leakage path eliminating could be achieved and stability of the circuit is increased.

12 Claims, 4 Drawing Sheets

(52) U.S. Cl.
CPC ... *G09G 3/3677* (2013.01); *G09G 2300/0408* (2013.01); *G09G 2354/00* (2013.01)

(58) Field of Classification Search
CPC ... G09G 3/3611; G09G 3/3648; G09G 3/3655
USPC ........................................................ 345/173
See application file for complete search history.

(56) References Cited

U.S. PATENT DOCUMENTS

| | | | |
|---|---|---|---|
| 9,123,283 B2 * | 9/2015 | Wang | G11C 19/28 |
| 9,257,084 B2 * | 2/2016 | Cao | G09G 3/3648 |
| 9,460,676 B2 * | 10/2016 | Dai | G11C 19/287 |
| 9,564,097 B2 * | 2/2017 | Cao | G09G 3/3677 |
| 9,613,582 B2 * | 4/2017 | Kim | G09G 3/3677 |
| 10,204,583 B2 * | 2/2019 | Lv | G11C 19/28 |
| 10,332,470 B2 * | 6/2019 | Feng | G09G 3/3622 |
| 2011/0142192 A1 * | 6/2011 | Lin | G09G 3/3677 |
| | | | 377/77 |
| 2012/0162187 A1 | 6/2012 | Lee | |
| 2014/0103983 A1 * | 4/2014 | Chang | G09G 3/3655 |
| | | | 327/198 |
| 2016/0049126 A1 * | 2/2016 | Zhang | G09G 3/3648 |
| | | | 345/173 |

FOREIGN PATENT DOCUMENTS

| | | |
|---|---|---|
| CN | 106251820 A | 12/2016 |
| CN | 106782389 A | 5/2017 |
| CN | 107221279 A | 9/2017 |

* cited by examiner

SINGLE-TYPE GOA CIRCUIT AND DISPLAY APPARATUS

RELATED APPLICATIONS

This application is a continuation application of PCT Patent Application No. PCT/CN2017/116988, filed Dec. 18, 2017, which claims the priority benefit of Chinese Patent Application No. 201711069470.3, filed Oct. 31, 2017, which is herein incorporated by reference in its entirety.

FIELD OF THE DISCLOSURE

The disclosure relates to a display technical field, and more particularly to a single-type GOA circuit and display apparatus.

BACKGROUND

Usually, in the array processing stage for manufacturing liquid crystal display panel nowadays, gate driving circuits are arranged on the array substrate by using Gate Driver on Array (GOA) technique so as to drive a line-by-line scanning on the gate lines. This technique would reduce the bonding process of external ICs and improve integration of the liquid crystal display panel. A GOA circuit usually comprises a plurality of cascaded GOA units. Each cascade GOA unit drives a corresponded horizontal scan line. Each cascaded GOA unit primarily comprises a pull-up unit, a pull-up control unit, a transmitting unit, a first pull-down unit, a pull-down holding unit, a voltage boosting unit for accomplishing voltage boost and a resetting unit for accomplishing voltage reset. Wherein, the pull-up unit is used primarily for outputting a clock signal as a gate signal; the pull-up control unit is used for controlling a working period of the pull-up unit and is usually connected to receive a transmitting signal from a previous one cascaded GOA unit; the first pull-down unit is used for pulling down the gate signal to a low potential; and the pull-down holding unit is used for holding the gate signal and a control signal of the pull-up circuit at the low potential. In addition, the structures and types of GOA circuits begin to differ from each other and divided into NMOS, PMOS and CMOS GOA circuit types after the Low Temperature Poly-Silicon (LTPS) is developed. During the production process, the number of masks for CMOS is usually 12, and the number of masks for single-type transistors, such as NMOS and PMOS, is usually equal to or less than 9. Therefore, the single-type GOA circuits based on LTPS are widely used to save production costs.

Touch panel (TP) suspending is that a GOA circuit with interrupt touch panel (ITP) function stops transmitting and scanning in a display period when the touch panel is displaying and a circuit detecting unit performs detection at the same time. However, in a regular GOA circuit, current leakage is an issue usually happened during a TP suspending period, and the stability of circuits is therefore affected. Accordingly, it is necessary to improve the GOA circuit to solve the issue in the existed techniques.

SUMMARY

Accordingly, the present invention provides a single-type GOA circuit and display apparatus to solve the problems in the existed techniques which risk pulling down the potential of the output terminal of the pull-up control unit during the TP suspending period and result in GOA circuit failure during transmission suspended period of the GOA circuit. The single-type GOA circuit and display apparatus is capable of changing loadings on source terminals of the TFT's along the current leakage path and voltage levels of the signals in the TP suspending period, so that voltage controlling on the current leakage path and leakage path eliminating during the TP suspending period could be achieved and stability of the circuit is increased.

A single-type GOA circuit characterized in comprising a pull-up control unit, a pull-down control unit and a controllable signal setting unit, wherein, the pull-up control unit is adopted for outputting a pull-up control signal: the pull-down control unit is adopted for outputting a pull-down control signal; and the controllable signal setting unit is connected to an output terminal of the pull-up control unit, wherein the controllable signal setting unit outputs a controllable signal, the controllable signal is held at a potential of a constant low-level voltage source when the single-type GOA circuit is operated in normal status, and the controllable signal is held at a potential of a constant high-level voltage source when the single-type GOA circuit is in a transmission suspended period.

In one embodiment, the single-type GOA circuit further comprises a pull-up unit for pulling up a potential of a gate signal output terminal in accordance with the pull-up control signal and a clock signal to output a gate signal; a pull-down unit for pulling down a potential of a control terminal of the pull-up unit to the potential of the constant low-level voltage source in accordance with the pull-down control signal to turn off the pull-up unit; and a circuit detection unit being connected to the pull-up unit and the pull-down unit and performing circuit detection when the single-type GOA circuit is in the transmission suspended period, the circuit detection unit further being connected to the pull-down control unit and receiving a variable signal, the variable signal being held at the potential of the constant low-level voltage source when the single-type GOA circuit is operated in normal status, and the variable signal being held at the potential of the constant high-level voltage source when the single-type GOA circuit is in the transmission suspended period.

In one embodiment, the controllable signal setting unit is further connected to the pull-up unit and the pull-down unit to perform circuit detection when the single-type GOA circuit is in the transmission suspended period. Preferably, the circuit detection unit comprises an eleventh switching element, a first terminal of the eleventh switching element being connected to the gate signal output terminal of the pull-up unit, and a second terminal and a control terminal of the eleventh switching element being connected to a control terminal of a twelfth switching element; the twelfth switching element, a first terminal of the twelfth switching element being connected to a control terminal of the pull-down unit, a second terminal of twelfth switching element being connected to the constant low-level voltage source, and the control terminal of the twelfth switching element being connected to the second terminal and control terminal of the eleventh switching element; and a fourteenth switching element, a first terminal of the fourteenth switching element being connected to an output terminal of the single-type GOA circuit, a second terminal of the fourteenth switching element being connected to the constant low-level voltage source, and a control terminal of the fourteenth switching element being connected to a fifth switching element in the pull-down control unit, wherein the control terminal of the fourteenth switching element receives the variable signal.

In one embodiment, an input signal of the pull-up control unit is set to the potential of the constant high-level voltage source when the single-type GOA circuit is in the transmission suspended period.

In one embodiment, the single-type GOA circuit further comprising a first capacitor and a second capacitor, wherein, one terminal of the first capacitor is connected to the constant low-level voltage source, and another terminal of the first capacitor is connected to the output terminal of the pull-up control unit; one terminal of the second capacitor is connected to the constant low-level voltage source, and another terminal of the second capacitor is connected to an output terminal of the pull-down control unit; wherein the first capacitor and the second capacitor are used for storing charges.

In one embodiment, the pull-up unit comprises a ninth switching element, wherein a first terminal of the ninth switching element is connected to receive a clock signal, a second terminal of the ninth switching element is connected to an input terminal of the pull-down unit and an output terminal of the single-type GOA circuit, and a control terminal of the ninth switching element is connected to the output terminal of the pull-up control unit.

In one embodiment, the pull-down unit comprises a tenth switching element, wherein a first terminal of the tenth switching element is connected to an output terminal of the pull-up unit, a second terminal of the tenth switching element is connected to the constant low-level voltage source, and a control terminal of the tenth switching element is connected to an output terminal of the pull-down control unit.

In one embodiment, P-type metal oxide semiconductor transistors or N-type metal oxide semiconductor transistors are used as the switching elements in the pull-down control unit, the pull-down unit, the pull-up control unit, the pull-up unit and the circuit detection unit.

A display apparatus characterized in comprising the single-type GOA circuit claimed in any one of the claims 1~9.

The beneficial effects obtained by performing the embodiments of the present invention are as follows:

Because, during the transmission suspended period of the GOA circuit, the potential of the output terminal of the pull-up control unit should be held at the potential of the constant high-level voltage source and the potentials of an input terminal of a second switching element of the pull-up control unit and the output terminal of the pull-down control unit should be held at the potential of the constant low-level voltage source, so that the potential of the output terminal of the pull-up control unit might be pulled down, i.e., current leakage from the output terminal of the pull-up control unit might occur along a path through the second switching element and the fifth switching element. Accordingly, through changing the loadings on source terminals of the TFT's along the current leakage path and voltage levels of the signals in the transmission suspended period in the present invention, voltage controlling on the current leakage path and leakage path eliminating could be achieved and stability of the circuit could be increased.

BRIEF DESCRIPTION OF THE DRAWINGS

In order to make the descriptions of the technique solutions of the embodiments of the present invention or the existed techniques, the drawings necessary for describing the embodiments or the existed techniques are briefly introduced below. Obviously, the drawings described below are only some embodiments of the present invention, and, for those with ordinary skill in this field, other drawings can be obtained from the drawings described below without creative efforts.

DETAILED DESCRIPTION OF PREFERRED EMBODIMENTS

The technique solutions of the embodiments of the present invention will be clearly and fully described below accompanying with the drawings of the embodiments of the present invention. Obviously, the embodiments described below are only a part, but not all, of the embodiments of the present invention. Other embodiments obtained by those with ordinary skill in this art without creative efforts should belong to the protection scope of the present invention.

One embodiment of the present invention provides a single-type GOA circuit suitable for TFT-LCD, and also could be a single-type GOA circuit based on LTPS. The width-length ratio of channel of the LTPS transistor is smaller and, therefore, the parasitic resistance and capacitance is smaller, and less affection is made on the stability of the circuit. In addition, the threshold voltage shifting of the LTPS transistor between positive voltage and negative voltage is very small, and it is not necessary to proceed ripple cancellation as in amorphous silicon transistors. Therefore, a GOA circuit based on LTPS has no need for including many pull-down holding elements, and the circuitry could be simplified. In addition, when the GOA is in the TP suspending period (transmission is suspended), the output terminal (node Q) of the pull-up control unit could be connected to the controllable signal setting unit through the fifth switching element NT5 in the pull-down control unit, the controllable signal is provided on the connection line, and the controllable signal is held at the voltage of the constant high-level voltage source during the TP suspending period to eliminate the current leakage path during the TP suspending period, which is also named as TP suspending current leakage path in the following description.

The embodiments of the present invention are suitable for GOA circuits having ITP (Interrupt Touch Panel) functions, and the LTPS elements comprised in the GOA circuits in the examples are all single-type elements. The number of masks used during manufacturing process could be reduced, and the manufacturing costs could be greatly saved.

Figure 1:
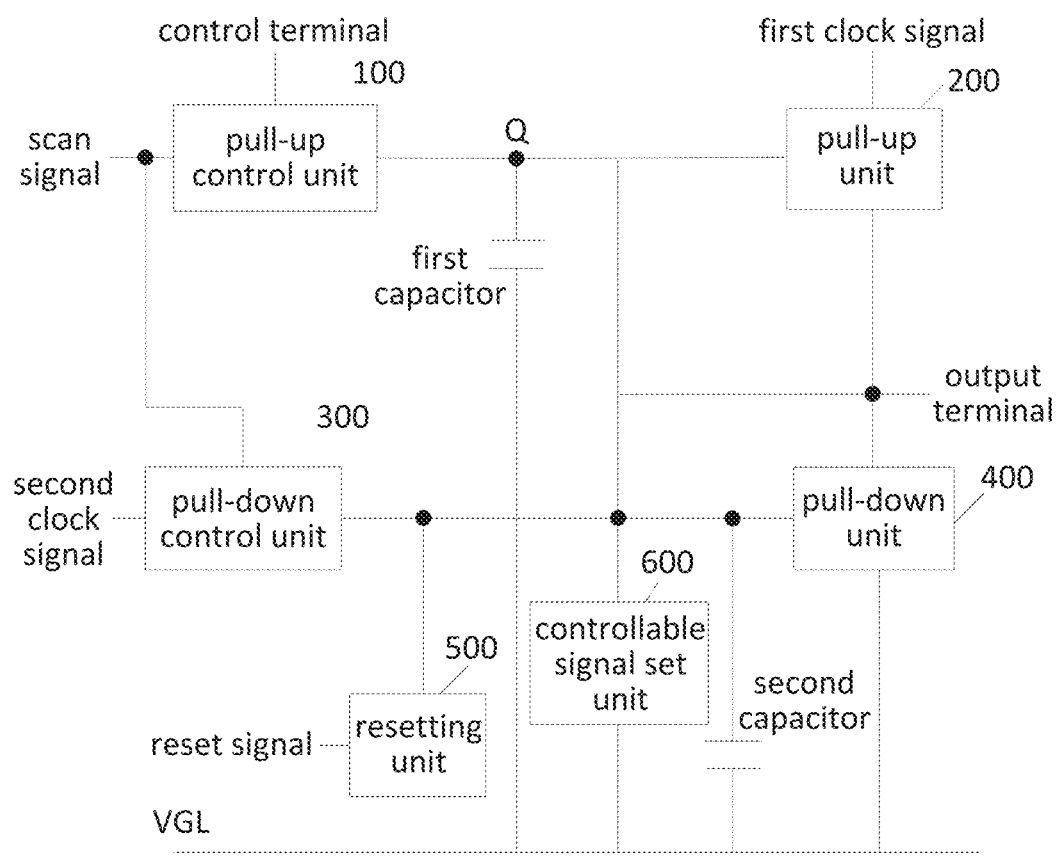
FIG. 1 is a structural block diagram of a single-type GOA circuit being prevented from leakage during TP suspending period according to one embodiment of the present invention.

In order to better understand the theory for eliminating TP suspending current leakage path by the embodiments of the present invention, circuitry operating schematic diagram of a single-type GOA circuit being prevented from leakage during TP suspending period according to one embodiment of the present invention would be discussed in the following descriptions. Please refer to FIG. 1, which is a structural block diagram of a single-type GOA circuit being prevented from leakage during TP suspending period according to one embodiment of the present invention. As shown in FIG. 1, the structural schematic diagram of the single-type GOA circuit comprises the pull-up control unit 100, the pull-up unit 200, the pull-down control unit 300, the pull-down unit 400, the resetting unit 500, the controllable signal setting unit 600, first capacitor and second capacitor. It is noted that, the output terminal of the pull-up control unit is connected with the node Q and the potentials thereof are kept the same, therefore, in order to simplify the description, the potential of the node Q in the following descriptions is also the potential of the output terminal of the pull-up control unit and are not distinguished from each other.

The pull-up control unit 100 is used for conducting the connection between the input terminal and the node Q (the output terminal of the pull-up control unit) under the control of the signal received by the control terminal, and providing a pull-up control signal to the pull-up unit.

The pull-up unit 200 is connected between the node Q and the output terminal, and is used for conducting the connection between the first clock signal line and the output terminal under the control of the potential of the node Q.

The pull-down control unit 300 is used for conducting the connection between the node Q and the controllable signal setting unit 600 under the control of the second clock signal, and providing a pull-down control signal to the pull-down unit.

The resetting unit 500 is used for conducting the connecting between the pull-down unit 200 and the constant low-level voltage source line VGL in accordance with a reset signal.

The controllable signal setting unit 600 is used to provide the controllable signal GAS2 during the TP suspending period. The controllable signal GAS2 is held at the potential of the constant low-level voltage source when the single-type GOA circuit is operated in normal status, and held at the potential of the constant high-level voltage source when the single-type GOA circuit is in the TP suspending period.

The fundamental operation theories of the GOA circuit are as follows: first, the pull-up control unit 100 is controlled by the control signal received by the control terminal to conduct the connection between the input terminal and output terminal (node Q) of the pull-up control unit 100, and to transmit a signal with high-level potential from the input terminal to the node Q, and the connection between the input terminal and the node Q is terminated to hold the high-level potential of the node when the potential of the clock signal is changed. At this time, the high-level potential of the node Q makes the high-level potential on the first cloak signal line in the pull-up unit 200 to be output to the output terminal, and the output terminal keeps outputting the high-level potential. When the resetting unit 500 receives a reset signal with high-level potential from the reset terminal, the connection between the node Q and the controllable signal set unit 600 and the connection between the pull-down unit 200 and the constant low-level voltage source line VGL are conducted, the pull-down control signal is output to the pull-down unit 400 from the pull-down control unit 300, and the potential of the output terminal is pulled down to the low-level potential by the pull-down unit 400.

Being specifically applied to the touch display panels, the potential of the node Q should be held at the high-level potential during the TP suspending period while proceeding touch-and-display stage. However, because there are current leakages existed in the switching elements, the node Q leaks charges to the input terminal of the pull-up control unit through the current leakage path in the second switching element NT2 in the pull-up control unit, and leaks charges to the constant low-level voltage source line VGL through the fifth switching element NT5 in the pull-down control unit. In order to reduce the leakage current and hold the potential of the node Q, the controllable signal set unit 600 is arranged in the current leakage path which begins from the node Q, goes through the fifth switching element NT5 in the pull-down control unit and reaches to the constant low-level voltage source line VGL, such that loadings of the node Q, i.e., the source terminal of the TFT, is not connected to the constant low-level voltage source directly but connected to the controllable signal set unit 600, and the controllable signal GAS2 and the input terminal of the pull-up control unit (the reverse scan signal D2U) are set to the potential of the constant high-level voltage source during the TP suspending period at the same time. By doing this, the TP suspending current leakage path could be eliminated, leakages from the node Q could be greatly reduced, and the stability of the GOA circuit during the TP suspending period could be guaranteed.

Figure 2:
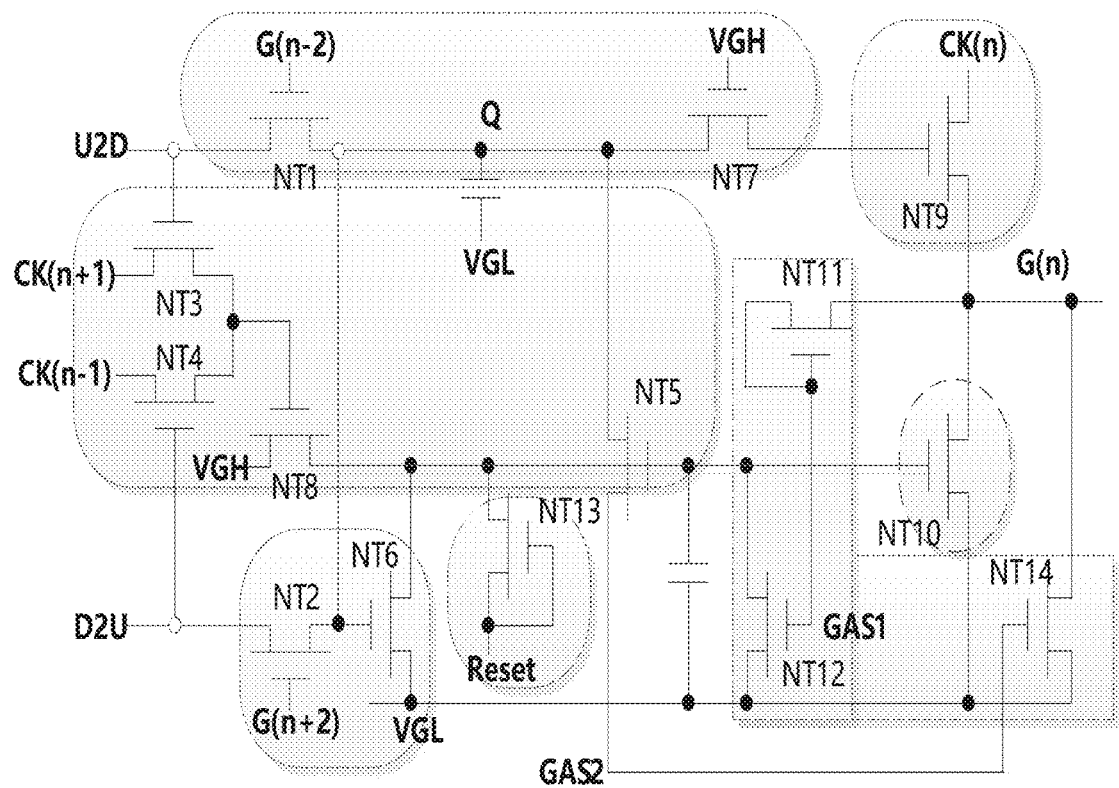
FIG. 2 is a circuitry operating schematic diagram of a single-type GOA circuit being prevented from leakage during TP suspending period according to one embodiment of the present invention.

In order to make the embodiments of the present invention more clearly, a GOA circuit unit is described below. Please refer to FIG. 2. FIG. 2 is a circuitry operating schematic diagram of a single-type GOA circuit being prevented from leakage during TP suspending period according to one embodiment of the present invention. Although the single-type GOA circuit comprises several GOA units connected in cascade, only one of the GOA driving units, which is the Nth GOA unit in the cascaded GOA units, is shown in FIG. 2. In the GOA circuit unit:

The pull-up control unit 100 comprises: the first switching element NT1, wherein the first terminal of the first switching element NT1 is connected to receive the forward scan signal U2D, the control of the first switching element NT1 is connected to receive the gate signal G(N−2) input from the (N−2)th GOA unit, and the second terminal of the first switching element NT1 is connected to the second terminal of the second switching element NT2, connected to the first terminal of the fifth switching element NT5 and the first terminal of the seventh switching element NT7 through the node Q, and outputs the pull-up control signal; the second switching element NT2, wherein the first terminal of the second switching element NT2 is connected to receive the reverse scan signal D2U, the control terminal of the second switching element NT2 is connected to receive the gate signal G(N+2) input from the (N+2)th GOA unit, and the second terminal of the second switching element NT2 is connected to the second terminal of the first switching element NT1 and the control terminal of the sixth switching element NT6; the sixth switching element NT6, wherein the first terminal of the sixth switching element NT6 is connected to the constant low-level voltage source line VGL, the terminal of the sixth switching element is connected to the second terminal of the second switching element NT2, and the second terminal of the sixth switching element NT6 is connected to the second terminal of the eighth switching element NT8 in the pull-down control unit; and the seventh switching element NT7, wherein the first terminal of the seventh switching element NT7 is connected to the second terminal of the first switching element NT1 through the node Q, the terminal of the seventh switching element NT7 is connected to the constant high-level voltage source line VGH, and the second terminal of the seventh switching element NT7 is connected to the control terminal of the ninth switching element NT9 in the pull-up unit.

The pull-up unit 200 comprises the ninth switching element NT9, wherein the control terminal (gate terminal) of the ninth switching element NT9 receives the pull-up control signal output from the pull-up control unit 100 through connecting with the second terminal of the seventh switching element NT7. Under the control of the pull-up control signal, the ninth switch element NT9 pulls up the potential of the gate signal output terminal (G(n) in the figure) in accordance with the clock signal CK(n) so that the current GOA unit outputs the gate signal.

The pull-down control unit 300 comprises: the third switching element NT3, wherein the first terminal of the third switching element NT3 is connected to receive the (N+1)th clock signal CK(n+1), the control terminal of the third switching element NT3 is connected to receive the forward scan signal U2D, and the second terminal of the third switching element NT3 is connected to the second terminal of the fourth switching element NT4 and the control terminal of the eighth switching element NT8; the fourth switching element NT4, wherein the first terminal of the fourth switching element NT4 is connected to receive the (N−1)th clock signal CK(n−1), the control terminal of the fourth switching element NT4 is connected to receive the reverse scan signal D2U, and the second terminal of the fourth switching element NT4 is connected to the second terminal of the third switching element NT3 and the control terminal of the eighth switching element NT8; the eighth switching element NT8, wherein the first terminal of the eighth switching element NT8 is connected to the constant high-level voltage source line VGH, the control terminal of the eighth switching element T8 is connected to the second terminal of the third switching element NT3 and the second terminal of the fourth switching element NT4, and the second terminal of the eighth switching element NT8 is connected to the second terminal of the sixth switching element NT6 in the pull-up control unit, the second terminal of the thirteenth switching element NT13 in the resetting unit, the control terminal of the fifth switching element NT5 and the control terminal of the tenth switching element NT10 in the pull-down unit; and the fifth switching element NT5, wherein the first terminal of the fifth switching element is connected to the second terminal of the first switching element NT1 through the node Q, the control terminal of the fifth switching element NT5 is connected to the second terminal of the twelfth switching element NT12 in the circuit detection unit and the control terminal of the tenth switching element NT10 in the pull-down unit, and the second terminal of the fifth switching element NT5 is connected to the control terminal of the fourteenth switching element NT14 in the TP unit and the controllable signal GAS2 is on the connection line there between. The potential of the controllable signal GAS2 is held to be the same as the potential of the constant low-level voltage source VGL during a period in which the display works normally and the potential of the controllable signal GAS2 is held to be the same as the potential of the constant high-level voltage source VGH during the TP suspending period, so that the current leakage paths of the node Q are connected to the potential VGH, the TP suspending current leakage paths could be eliminated, leakages from the node Q could be greatly reduced, and the stability of the entire GOA circuit during the TP suspending period could be guaranteed.

The pull-down unit 400 comprises the tenth switching element NT10, wherein the first terminal of the tenth switching element NT10 is connected to the second terminal of the ninth switching element NT9 in the pull-up unit (i.e., the output terminal) and the second terminal of the eleventh switching element NT11 in the circuit detection unit, the control terminal of the tenth switching element NT10 is connected to the control terminal of the fifth switching element NT5 in the pull-down control unit and the second terminal of the twelfth switching element NT12 in the circuit detection unit, and the second terminal of the tenth switching element NT10 is connected to the constant low-level voltage source line VGL. After the pull-down control signal is received by the control terminal (gate terminal) of the tenth switching element NT10, the connection between the output terminal G(n) and the constant low-level voltage source line VGL is conducted. Therefore, the potential of the output terminal G(n) can be pulled down.

The resetting unit 500 comprises the thirteenth switching element NT13, wherein the first terminal and the control terminal of the thirteenth switching element NT13 are short-connected and are connected to receive the reset signal, and the second terminal of the thirteenth switching element NT13 is connected to the second terminal of the eighth switching element NT8 in the pull-down control unit, the control terminal of the fifth switching element NT5 and the control terminal of the tenth switching element NT10 in the pull-down unit. The structure of the reset unit is simple and easy to be accomplished.

The circuit detection unit comprises: the eleventh switching element NT11, wherein the first terminal and the control terminal of the eleventh switching element NT11 are short-connected and are connected to the control terminal of the twelfth switching element NT12 while the GAS1 signal is on the line connected between the eleventh switching element NT11 and the twelfth switching element NT12, and the second terminal of the eleventh switching element NT11 is connected to the second terminal of the ninth switching element NT9 in the pull-up unit, the first terminal of the tenth switching element NT10 in the pull-down unit and the output terminal G(n); the twelfth switching element NT12, wherein the first terminal of the twelfth switching element NT12 is connected to the constant low-level voltage signal source line VGL, the control terminal of the twelfth switching element NT11 is connected to the first terminal and the control terminal of the eleventh switching element NT11 while the signal GAS1 is on the line connected between the eleventh switching element NT11 and the twelfth switching element NT12, and the second terminal of the twelfth switching element NT12 is connected to the control terminal of the fifth switching element NT5 in the pull-down control unit and the control terminal of the tenth switching element NT10 in the pull-down unit; and the fourteenth switching element NT14, wherein the first terminal of the fourteenth switching element NT14 is connected to the constant low-level voltage source line VGL, the second terminal of the fourteenth switching element NT14 is connected to the output terminal G(n), and the control terminal of the fourteenth switching element NT14 is connected to receive the variable signal through the second terminal of the fifth switching element NT5 in the pull-down control unit. The variable signal having the same property as the controllable signal. The potential of the variable signal is held to be the same as the potential of the constant low-level voltage source VGL during the period in which the display works normally and the potential of the variable signal is held to be the same as the potential of the constant high-level voltage source VGH during the TP suspending period, so that the current leakage paths of the node Q are connected to the potential VGH, the TP suspending current leakage paths could be eliminated, leakages from the node Q could be greatly reduced, and the stability of the entire GOA circuit during the TP suspending period could be guaranteed.

The two terminals of the first capacitor are connected to the node Q and the constant low-level voltage source line VGL, respectively. The two terminals of the second capacitor are connected to the control terminal of the fifth switching element NT5 in the pull-down control unit and the constant low-level voltage source line VGL. Wherein, the first capacitor and the second capacitor are both used for storing charges.

Compared with the solution of connecting the node Q to the constant low-level voltage source line VGL through the fifth switching element NT5, the solution of the present embodiment, in which the node Q is connected to the controllable signal set unit through the fifth switching element NT5 while the controllable signal GAS2 is on the line connected there between, i.e., the second terminal of the fifth switching element is connected to the control terminal of the fourteenth switching element NT14 in the circuit detection unit, the potential of the controllable signal GAS2 is held to be the same as the potential of the constant low-level voltage source VGL during the period in which the display works normally, and the potential of the controllable signal GAS2 is held to be the same as the potential of the constant high-level voltage source VGH and the potential of the reverse scan signal D2U is set to be the same as the potential of the constant high-level voltage source during the TP suspending period, makes the current leakage paths of the node Q to be connected to the potential VGH so that the TP suspending current leakage paths could be eliminated, leakages from the node could be greatly reduced, and the stability of the entire GOA circuit during the TP suspending period could be guaranteed.

Figure 3:
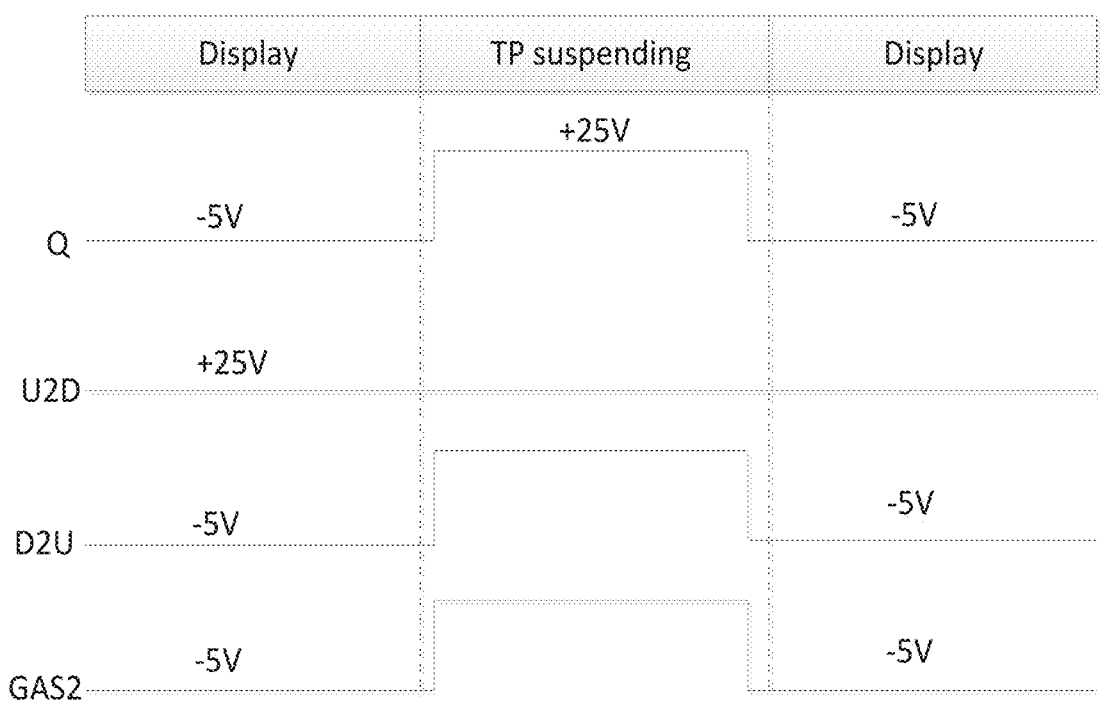
FIG. 3 is a timing sequence diagram related to a single-type GOA circuit being prevented from leakage during TP suspending period according to one embodiment of the present invention.

The timing sequence corresponding to the operation theories of the GOA circuit unit described above in the TP suspending period is illustrated in FIG. 3. The operation theories are as follows:

In the Display period (normally displaying), the fifth switching element NT5 is conducted, the node Q is connected to the circuit detection unit through the fifth switching element NT5 and the controllable signal GAS2 is on the line connected there between. Because the potential of the controllable signal GAS2 is held to be the same as the potential of the constant low-level voltage source VGL, the potential of the node Q is held to be the same as the potential of the constant low-level voltage source VGL. In the TP suspending period, the fifth switching element NT5 is terminated so that the potential of the node Q is held to be the same as the constant high-level voltage source VGH.

In the Display period (normally displaying) and the TP suspending period, the potential of the forward scan signal U2D is always held to be the same as the potential of the constant high-level voltage source VGH.

In the Display period (normally displaying), the potential of the reverse scan signal D2U is held to be the same as the potential of the constant low-level voltage source VGL. In the TP suspending period, the potential of the reverse scan signal D2U is set to be the potential of the constant high-level voltage source VGH, that is, the potential of the reverse scan signal D2U is held to be the same as the potential of the constant high-level voltage source VGH during the TP suspending period, so as to prevent the node Q from leaking charges to the terminal receiving the reverse scan signal D2U through the second switching element.

In the Display period (normally displaying), the potential of the controllable signal GAS2 is held to be the same as the potential of the constant low-level voltage source VGL. In the TP suspending period, the potential of the controllable signal GAS2 is held to be the same as the potential of the constant high-level voltage source VGH.

It is noted that, the constant low-level voltage VGL and the constant high-level voltage VGH is different between different circuitries. The constant low-level voltage VGL is set to be −5V and the constant high-level voltage VGH is set to be 25V in the present embodiment, and the settings in the present embodiment are only for describing the present invention in a easier way but not for limiting the present invention.

The present invention connects the node Q to the controllable signal set unit through the fifth switching element in the pull-down control unit while the controllable signal GAS2 is on the line connected there between, the potential of the controllable signal GAS2 is held to be the same as the potential of the constant low-level voltage source VGL during the period in which the display works normally, the potential of the controllable signal GAS2 is held to be the same as the potential of the constant high-level voltage source VGH during the TP suspending period, and the potential of the reverse scan signal D2U is further set to be the same as the potential of the constant high-level voltage source during the TP suspending period, so that the current leakage paths of the node Q are connected to the potential VGH, the TP suspending current leakage paths could be eliminated, leakages from the node could be greatly reduced, and the stability of the entire GOA circuit during the TP suspending period could be guaranteed.

More specifically, the second terminal of the fifth switching element NT5 in the pull-down control unit is connected to the control terminal of the fourteenth switching element NT14 in the circuit detection unit, wherein the control terminal of the fourteenth switching element NT14 in the circuit detection unit receives the variable signal. Because the variable signal and the controllable signal GAS2 have the same property, the controllable signal GAS2 could be deemed as the variable signal in this situation, that is, the potential of the variable signal is held to be the same as the potential of the constant low-level voltage source VGL during the period in which the display works normally, and the potential of the variable signal is held to be the same as the potential of the constant high-level voltage source VGH during the TP suspending period, and the control terminal of the fourteenth switching element NT14 in the circuit detection unit is connected to the second terminal of the fifth switching element NT5 in the pull-down control unit while the variable signal (controllable signal GAS2) is on the line connected there between. By adopting the solution, the controllable signal set unit and other extra elements are not necessary anymore, the manufacturing process is compatible to the overall process, the effect of eliminating current leakage paths is better, the manufacturing cost is lower, and it is easy to be accomplished.

In a preferred embodiment, the switching elements above could be thin film transistors (TFT's). The first terminals of the switching elements above correspond to the drain terminals of the TFT's, the second terminals of the switching elements above correspond to the source electrodes of the TFT's, and the control terminals of the switching elements above correspond to the gate terminals of the TFT's.

It is noted that, the GOA circuit unit described above is only an example, those skilled in the art could adjust the elements and connection relationships in each unit while referencing to the embodiments above, or accomplishes the GOA circuit unit comprising the six units provided in the embodiments of the present invention by applying signals different from the embodiments on the signal lines. Therefore, the essence of the variations above is not deviated from the spirit and scope of the embodiments of the present invention.

Based on the same invention concept, one embodiment of the present invention provides a display apparatus, which is characterized in that the display apparatus adopts any one single-type GOA circuit unit in the embodiments described above to be the GOA circuit unit thereof. The display apparatus might be any product or part with display function, such as liquid crystal panels, electronic papers, OLED panels, mobile phones, tablet computers, TV's, monitors, notebooks, digital photo frames and navigators.

Because the display apparatus provided in the present embodiment owns the technique features the same as any one of the single-type GOA circuit units provided in the embodiments above, the display apparatus could solve the same technique issues and result in the same technique effects.

Figure 4:
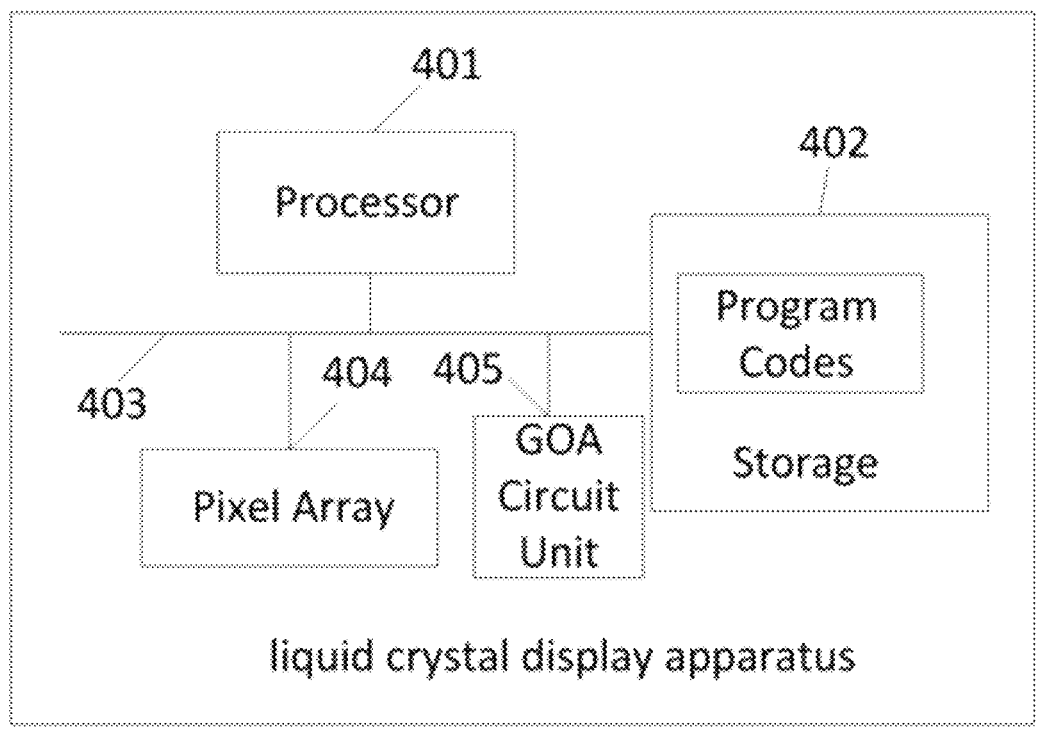
FIG. 4 is a structural schematic diagram of a liquid crystal display apparatus according to one embodiment of the present invention.

Please refer to FIG. 4, which is a structural schematic diagram of a liquid crystal display apparatus according to one embodiment of the present invention based on the single-type GOA circuit being prevented from leakage during TP suspending period. As shown in FIG. 4, the liquid crystal display apparatus could comprise: at least one processor 401 (such as CPU), storage 402, at least one communication bus 403, pixel array 404 and GOA circuit unit 405. Wherein, the communication bus 403 is used for supporting communications made between the components. The storage 402 could be high-speed RAM storage or a non-volatile memory, such as at least one magnetic disk storage. The storage 402 is selectively to comprise at least one storing apparatus away from the processor 401. The pixel array 404 is used for displaying images. The GOA circuit unit 405 is used for driving to scan the gate lines Gate line-by-line.

It can be understood by those with ordinary skill in the art that all or part of the processes in the method of the above-mentioned embodiments could be accomplished through using related hardware according to the computer programs. The programs could be stored in a computer readable storage medium so that, when the program is executed, the flows in the method described in the above embodiments can be included therein. Wherein, the storage medium could be magnetic disks, optical disks, read-only memory (ROM) or random access memory (RAM).

The single-type GOA circuit and display apparatus provided in the embodiments of the present invention are explained in detail as above. The theories and implementations are described by using specific examples in the description, and the explanation of the above embodiments are only for assisting the understanding of the solutions and core concepts of the present invention. Meanwhile, for those with ordinary skill in the art, the specific implementations and application scopes could be changed according to concepts of the present invention. In summary, the contents of the disclosure should not be deemed as limitations to the present invention.

What is claimed is:

1. A single-type gate driver on array (GOA) circuit characterized in comprising a plurality of GOA units connected in cascade, a nth GOA unit comprising a pull-up control unit, a pull-down control unit and a controllable signal setting unit, wherein,
the pull-up control unit is adopted for outputting a pull-up control signal;
the pull-down control unit is adopted for outputting a pull-down control signal;
the controllable signal setting unit is connected to an output terminal of the pull-up control unit, wherein the controllable signal setting unit outputs a controllable signal, the controllable signal is held at a potential of a constant low-level voltage source when the single-type GOA circuit is operated in normal status, and the controllable signal is held at a potential same as a potential of a constant high-level voltage source when the single-type GOA circuit is in a transmission suspended period;
wherein the single-type GOA circuit further comprises:
a pull-up unit for pulling up a potential of a gate signal output terminal in accordance with the pull-up control signal and a clock signal to enable the nth GOA unit to output a gate signal;
a pull-down unit for pulling down a potential of a control terminal of the pull-up unit to the potential of the constant low-level voltage source in accordance with the pull-down control signal to turn off the pull-up unit; and
a circuit detection unit being connected to the pull-up unit and the pull-down unit and performing circuit detection when the single-type GOA circuit is in the transmission suspended period, the circuit detection unit further being connected to the pull-down control unit and receiving a variable signal, the variable signal being held at the potential of the constant low-level voltage source when the single-type GOA circuit is operated in normal status, and the variable signal being help at the potential of the constant high-level voltage source when the single-type GOA circuit is in the transmission suspended period;
wherein the circuit detection unit comprises:
an eleventh switching element, a first terminal of the eleventh switching element being connected to the gate signal output terminal of the pull-up unit, and a second terminal and a control terminal of the eleventh switching element being connected to a control terminal of a twelfth switching element;
the twelfth switching element, a first terminal of the twelfth switching element being connected to a control terminal of the pull-down unit, a second terminal of twelfth switching element being connected to the constant low-level voltage source, and the control terminal of the twelfth switching element being connected to the second terminal and control terminal of the eleventh switching element; and
a fourteenth switching element, a first terminal of the fourteenth switching element being connected to an output terminal of the single-type GOA circuit, a second terminal of the fourteenth switching element being connected to the constant low-level voltage source, and a control terminal of the fourteenth switching element being connected to a fifth switching element in the pull-down control unit, wherein the control terminal of the fourteenth switching element receives the variable signal.

2. The single-type GOA circuit according to claim 1, characterized in that an input signal of the pull-up control unit is set to the potential of the constant high-level voltage source when the single-type GOA circuit is in the transmission suspended period.

3. The single-type GOA circuit according to claim 1, characterized in further comprising a first capacitor and a second capacitor, wherein, one terminal of the first capacitor is connected to the constant low-level voltage source, and another terminal of the first capacitor is connected to the output terminal of the pull-up control unit;

one terminal of the second capacitor is connected to the constant low-level voltage source, and another terminal of the second capacitor is connected to an output terminal of the pull-down control unit;

wherein the first capacitor and the second capacitor are used for storing charges.

4. The single-type GOA circuit according to claim 1, characterized in that the pull-up unit comprises:

a ninth switching element, a first terminal of the ninth switching element being connected to receive the clock signal, a second terminal of the ninth switching element being connected to an input terminal of the pull-down unit and the output terminal of the single-type GOA circuit, and a control terminal of the ninth switching element being connected to the output terminal of the pull-up control unit.

5. The single-type GOA circuit according to claim 1, characterized in that the pull-down unit comprises:

a tenth switching element, a first terminal of the tenth switching element being connected to an output terminal of the pull-up unit, a second terminal of the tenth switching element being connected to the constant low-level voltage source, and a control terminal of the tenth switching element being connected to an output terminal of the pull-down control unit.

6. The single-type GOA circuit according to claim 1, characterized in that P-type metal oxide semiconductor transistors or N-type metal oxide semiconductor transistors are used as the switching elements in the pull-down control unit, the pull-down unit, a resetting unit, the pull-up control unit, the pull-up unit and the circuit detection unit.

7. A display apparatus characterized in comprising a single-type gate driver on array (GOA) circuit, the single-type GOA circuit comprising a plurality of GOA units connected in cascade, a nth GOA unit comprising a pull-up control unit, a pull-down control unit and a controllable signal setting unit, wherein, the pull-up control unit is adopted for outputting a pull-up control signal;

the pull-down control unit is adopted for outputting a pull-down control signal;

the controllable signal setting unit is connected to an output terminal of the pull-up control unit, wherein the controllable signal setting unit outputs a controllable signal, the controllable signal is held at a potential of a constant low-level voltage source when the single-type GOA circuit is operated in normal status, and the controllable signal is held at a potential same as a potential of a constant high-level voltage source when the single-type GOA circuit is in a transmission suspended period;

wherein the single-type GOA circuit further comprises:

a pull-up unit for pulling up a potential of a gate signal output terminal in accordance with the pull-up control signal and a clock signal to enable the nth GOA unit to output a gate signal;

a pull-down unit for pulling down a potential of a control terminal of the pull-up unit to the potential of the constant low-level voltage source in accordance with the pull-down control signal to turn off the pull-up unit; and a circuit detection unit being connected to the pull-up unit and the pull-down unit and performing circuit detection when the single-type GOA circuit is in the transmission suspended period, the circuit detection unit further being connected to the pull-down control unit and receiving a variable signal, the variable signal being held at the potential of the constant low-level voltage source when the single-type GOA circuit is operated in normal status, and the variable signal being help at the potential of the constant high-level voltage source when the single-type GOA circuit is in the transmission suspended period;

wherein the circuit detection unit comprises:

an eleventh switching element, a first terminal of the eleventh switching element being connected to the gate signal output terminal of the pull-up unit, and a second terminal and a control terminal of the eleventh switching element being connected to a control terminal of a twelfth switching element;

the twelfth switching element, a first terminal of the twelfth switching element being connected to a control terminal of the pull-down unit, a second terminal of twelfth switching element being connected to the constant low-level voltage source, and the control terminal of the twelfth switching element being connected to the second terminal and control terminal of the eleventh switching element; and a fourteenth switching element, a first terminal of the fourteenth switching element being connected to an output terminal of the single-type GOA circuit, a second terminal of the fourteenth switching element being connected to the constant low-level voltage source, and a control terminal of the fourteenth switching element being connected to a fifth switching element in the pull-down control unit, wherein the control terminal of the fourteenth switching element receives the variable signal.

8. The display apparatus according to claim 7, characterized in that an input signal of the pull-up control unit is set to the potential of the constant high-level voltage source when the single-type GOA circuit is in the transmission suspended period.

9. The display apparatus according to claim 7, characterized in that the single-type GOA circuit further comprises a first capacitor and a second capacitor, wherein, one terminal of the first capacitor is connected to the constant low-level voltage source, and another terminal of the first capacitor is connected to the output terminal of the pull-up control unit;

one terminal of the second capacitor is connected to the constant low-level voltage source, and another terminal of the second capacitor is connected to an output terminal of the pull-down control unit;

wherein the first capacitor and the second capacitor are used for storing charges.

10. The display apparatus according to claim 7, characterized in that the pull-up unit comprises:

a ninth switching element, a first terminal of the ninth switching element being connected to receive the clock signal, a second terminal of the ninth switching element being connected to an input terminal of the pull-down unit and the output terminal of the single-type GOA circuit, and a control terminal of the ninth switching element being connected to the output terminal of the pull-up control unit.

11. The display apparatus according to claim 7, characterized in that the pull-down unit comprises:

a tenth switching element, a first terminal of the tenth switching element being connected to an output terminal of the pull-up unit, a second terminal of the tenth switching element being connected to the constant low-level voltage source, and a control terminal of the tenth switching element being connected to an output terminal of the pull-down control unit.

12. The display apparatus according to claim 7, characterized in that P-type metal oxide semiconductor transistors or N-type metal oxide semiconductor transistors are used as the switching elements in the pull-down control unit, the pull-down unit, a resetting unit, the pull-up control unit, the pull-up unit and the circuit detection unit.

* * * * *